United States Patent

Aoki et al.

[11] Patent Number: 5,957,662
[45] Date of Patent: Sep. 28, 1999

[54] HELICOPTER BLADE AEROFOIL

[75] Inventors: Makoto Aoki; Hiroki Nishimura; Eiichi Yamakawa, all of Kakamigahara, Japan

[73] Assignee: Advanced Technology Institute of Commuter-Helicopter, Ltd., Gifu, Japan

[21] Appl. No.: 08/945,300
[22] PCT Filed: Mar. 5, 1997
[86] PCT No.: PCT/JP97/00674
§ 371 Date: Oct. 17, 1997
§ 102(e) Date: Oct. 17, 1997
[87] PCT Pub. No.: WO97/32780
PCT Pub. Date: Sep. 12, 1997

[30] Foreign Application Priority Data

Mar. 8, 1996 [JP] Japan .................................. 8-052121

[51] Int. Cl.$^6$ .................................................. B64C 27/467
[52] U.S. Cl. ............... 416/223 R; 416/243; 416/DIG. 2; 416/DIG. 5
[58] Field of Search ................ 416/223 R, 243, 416/DIG. 2, DIG. 5

[56] References Cited

U.S. PATENT DOCUMENTS

| 3,728,045 | 4/1973 | Balch ....................... 416/223 |
| 4,314,795 | 2/1982 | Dadone . |
| 4,325,675 | 4/1982 | Gallot et al. . |
| 4,744,728 | 5/1988 | Lednicer et al. . |

FOREIGN PATENT DOCUMENTS

| 50-102099 | 8/1975 | Japan . |
| 59-134096 | 8/1984 | Japan . |
| 62-34600 | 7/1987 | Japan . |
| 63-64894 | 3/1988 | Japan . |
| 4-358995 | 12/1992 | Japan . |

OTHER PUBLICATIONS

International Search Report dated May 30, 1997 for pending European Patent Application PCT/JP97/00674.

Primary Examiner—Christopher Verdier
Assistant Examiner—Matthew T. Shanley
Attorney, Agent, or Firm—Baker & Botts, L.L.P.

[57] ABSTRACT

In a helicopter blade aerofoil, upper and lower surfaces thereof are defined by the following coordinates, and the leading edge profile of the aerofoil is defined by the following leading edge radius and center of circle. Thus drag divergence Mach number Mdd and maximum lift coefficient Clmax can be increased and the level of noise can be reduced.

| X/C | Yup/C | Ylow/C |
|---|---|---|
| 0.00000 | 0.00000 | 0.00000 |
| 0.00250 | 0.00781 | −0.00558 |
| 0.00500 | 0.01131 | −0.00765 |
| 0.00750 | 0.01423 | −0.00874 |
| 0.01000 | 0.01660 | −0.00964 |
| 0.01750 | 0.02224 | −0.01156 |
| 0.02500 | 0.02658 | −0.01276 |
| 0.50000 | 0.03585 | −0.01568 |
| 0.07500 | 0.04128 | −0.01758 |
| 0.10000 | 0.04480 | −0.01901 |
| 0.15000 | 0.04893 | −0.02113 |
| 0.20000 | 0.05095 | −0.02306 |
| 0.25000 | 0.05181 | −0.02492 |
| 0.30000 | 0.05200 | −0.02647 |
| 0.35000 | 0.05179 | −0.02760 |
| 0.40000 | 0.05129 | −0.02821 |
| 0.45000 | 0.05038 | −0.02827 |
| 0.50000 | 0.04888 | −0.02775 |
| 0.55000 | 0.04673 | −0.02662 |
| 0.60000 | 0.04393 | −0.02491 |
| 0.65000 | 0.04037 | −0.02268 |
| 0.70000 | 0.03592 | −0.01996 |
| 0.75000 | 0.03052 | −0.01682 |
| 0.80000 | 0.02430 | −0.01337 |
| 0.85000 | 0.01751 | −0.00974 |
| 0.90000 | 0.01046 | −0.00597 |
| 0.95000 | 0.00407 | −0.00236 |
| 1.00000 | 0.00207 | −0.00079 |

Leading edge radius r/C = 0.00844,
Center of circle X/C = 0.00842, Y/C = 0.00064, 4 Claims, 6 Drawing Sheets

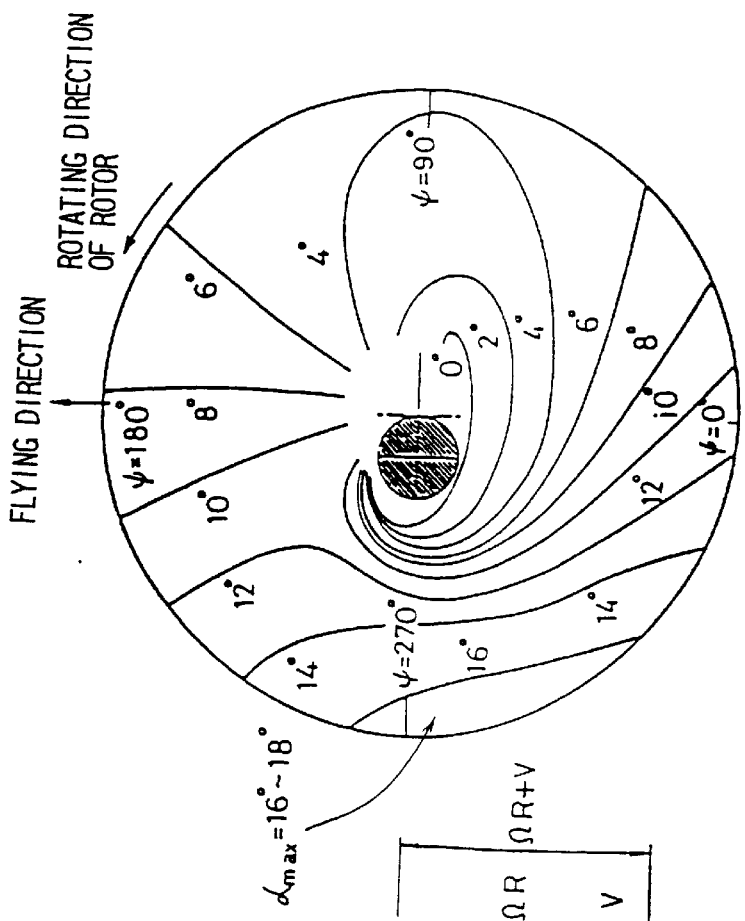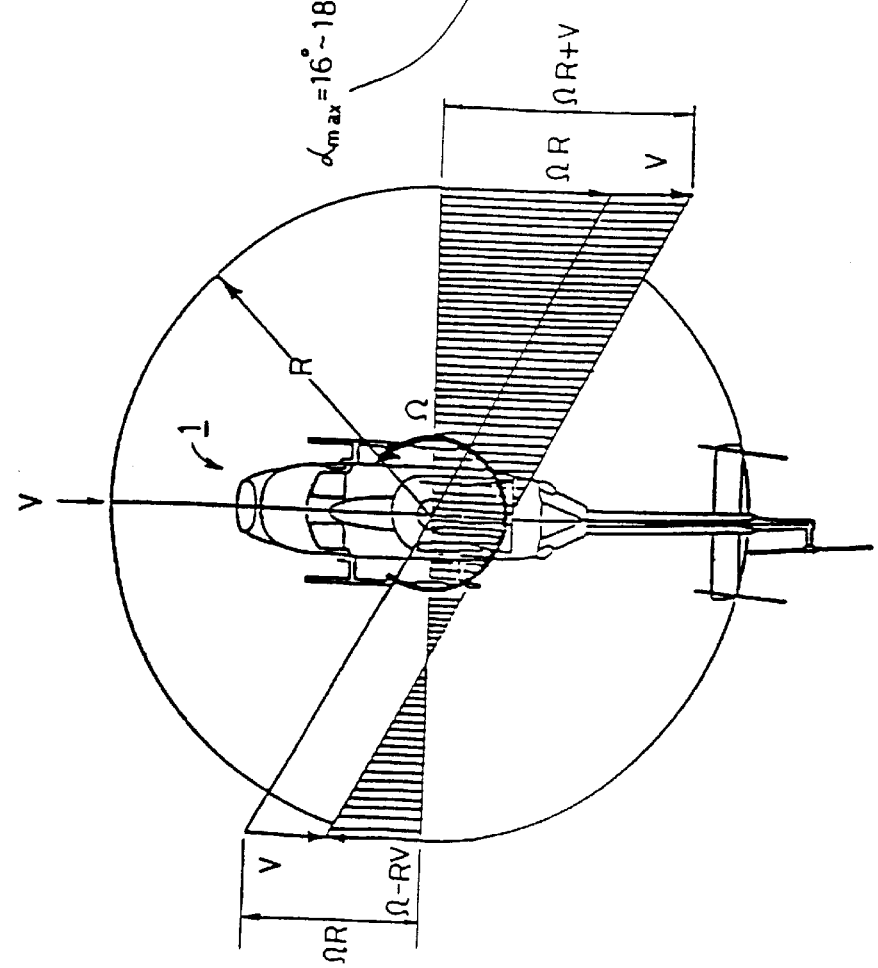
FIG. 4A
FIG. 4B

HELICOPTER BLADE AEROFOIL

This application has been filed under 35 U.S.C. 371 and claims foreign priority benefits under 35 U.S.C. 119 of PCT/JP97/00674, filed Mar. 5, 1997, which is based upon Japanese patent application Serial #: 8-52121, filed Mar. 8, 1996.

TECHNICAL FIELD

The present invention relates to a helicopter blade aerofoil.

BACKGROUND ART

FIGS. 4A and 4B are illustrative views for showing aerodynamic characteristics of a rotor of a helicopter in forward flight. As shown in FIG. 4A, when a helicopter 1 with a rotor having a radius R which is rotating at a rotational angular velocity $\Omega$ advances at a ground velocity V, the airspeeds of an advancing blade where the rotational speed of the rotor is added to the ground velocity V and a retreating blade where the ground velocity V is subtracted from the rotational speed of the rotor are significantly different.

In particular, at a position of an azimuth angle $\Psi$ (angle measured counterclockwise from the rearward direction of the helicopter 1) of 90° the airspeed of the advancing blade reaches a maximum and the airspeed of a tip of the advancing blade becomes $\Omega \times R + V$. At a position of $\Psi = 270°$, on the other hand, the airspeed of the retreating blade reaches a minimum and the airspeed of a tip of the retreating blade becomes $\Omega \times R - V$. The airspeed of an intermediate portion of the retreating blade takes a value obtained by proportional distribution of $\Omega \times R + V$ and $\Omega \times R - V$. For example, when $\Omega \times R = 795$ km/h and V=278 km/h are assumed, the airspeed at a position of about 35% from the root end of the retreating blade becomes zero, as shown in FIG. 4A.

Since the airspeeds of the blades thus vary greatly while the blades make one revolution, various phenomena take place. On an advancing blade, drag coefficient Cd increases rapidly as the airspeeds approach the speed of sound. When the airspeeds are given in terms of Mach number M, drag divergence Mach number Mdd is defined as Mach number of a time when increment $\Delta$ Cd of drag coefficient Cd divided by increment $\Delta$ M of Mach number ($\Delta$ Cd/$\Delta$ M) becomes 0.1. Drag divergence Mach number Mdd depends on a blade aerofoil section, and it is said that the greater the value, the better the blade becomes because a higher airspeed of the blade can be achieved. It is common to set the airspeed of the tip of the advancing blade to around Mach 0.85.

On a retreating blade, on the other hand, since the airspeed thereof is significantly lowered, angle of attack $\Delta$ of the retreating blade must be greater in order to produce a lift similar to that of the advancing blade. For this purpose, it is common to carry out pitch control wherein a pitch angle of the retreating blade is controlled in accordance to azimuth angle $\Psi$. While the pitch angle of the blade is controlled as a sinewave function which has a minimum amplitude at $\Psi = 90°$ and a maximum amplitude at $\Psi = 270°$, angle of attack $\alpha$ of the blade in this case varies in the direction of span as shown in FIG. 4B due to flapping of the blade itself. For example, when the blade is at the position of $\Psi = 90°$, the angle of attack $\alpha$ becomes about 0° at the root end and about 4° at the tip end. When $\Psi = 270°$, the angle of attack $\alpha$ of the blade becomes about 0° at the root end and about 16° to 18° at the tip end, thus exceeding the stall angle of attack.

Characteristics used for evaluating a retreating blade include maximum lift coefficient Clmax and stall angle of attack, the maximum lift coefficient Clmax defined as the maximum value of lift coefficient when the angle of attack $\alpha$ of a blade having a particular aerofoil section is gradually increased and reached the stall angle of attack. The blade is said to be better when the values of maximum lift coefficient Clmax and stall angle of attack are greater.

FIG. 5 is a graph showing an operating environment of helicopter rotor blades. The advancing blade at $\Psi = 90°$ has a Mach number near the drag divergence Mach number Mdd and a lift coefficient Cl of about zero. The blade at $\Psi = 0°$ and 180° is in a hovering state which is independent of the ground velocity V, while Mach number M is about 0.6 and lift coefficient Cl is about 0.6. The retreating blade at $\Psi = 270°$ has a Mach number of 0.3 to 0.5 and a lift coefficient Cl near the maximum lift coefficient Clmax. As the blade makes a full revolution, Mach number and lift coefficient vary greatly by going around these states described above.

Hence a helicopter blade aerofoil is required 1) to have a large value of drag divergence Mach number Mdd, and 2) to have a large value of maximum lift coefficient Clmax, while a better flight performance of a helicopter is achieved when these values are greater.

There are known as prior arts related to helicopter blade aerofoils, Japanese Unexamined Patent Publication JP-A 50-102099(1975), JP-A 59-134096(1984), JP-A 63-64894 (1988) and Japanese Examined Patent Publication JP-B2 62-34600(1987)

Recently such attempts have been proposed that helicopters commute regularly by using roof floors of buildings or open public spaces as heliports, and for which it is required to minimize the noise of helicopters in flight.

FIG. 6 is a graph showing frequency spectrums of noises generated by a helicopter. The noises of the helicopter are classified into several categories on the basis of origins of the noises, while harmonic components of the main rotor rotation frequency are distributed in a range from 10 to 100 Hz, harmonic components of the tail rotor rotation frequency are distributed in a range from 60 to 300 Hz, and broadband noise of the main rotor is distributed from 60 to 300 Hz. When the helicopter is flying at high speed, HSI (High-Speed Impulsive noise) is generated in a range from 60 to 300 Hz.

DISCLOSURE OF THE INVENTION

An objective of the invention is to provide a helicopter blade aerofoil in which large values of drag divergence Mach number Mdd and maximum of lift coefficient Clmax can be obtained and the level of noise can be reduced.

The invention provides a helicopter blade aerofoil having coordinate values with ±3% errors of upper and lower surfaces on the basis of a reference aerofoil having a thickness to chord ratio of 8% (hereinafter referred to as AK080A), of which upper and lower surfaces are substantially defined by the following coordinates and of which leading edge profile is substantially defined by the following leading edge radius and center of a circle:

| X/C | Yup/C | Ylow/C |
|---|---|---|
| 0.00000 | 0.00000 | 0.00000 |
| 0.00250 | 0.00781 | −0.00558 |
| 0.00500 | 0.01131 | −0.00765 |
| 0.00750 | 0.01423 | −0.00874 |
| 0.01000 | 0.01660 | −0.00964 |
| 0.01750 | 0.02224 | −0.01156 |
| 0.02500 | 0.02658 | −0.01276 |
| 0.50000 | 0.03585 | −0.01568 |
| 0.07500 | 0.04128 | −0.01758 |
| 0.10000 | 0.04480 | −0.01901 |
| 0.15000 | 0.04893 | −0.02113 |
| 0.20000 | 0.05095 | −0.02306 |
| 0.25000 | 0.05181 | −0.02492 |
| 0.30000 | 0.05200 | −0.02647 |
| 0.35000 | 0.05179 | −0.02760 |
| 0.40000 | 0.05129 | −0.02821 |
| 0.45000 | 0.05038 | −0.02827 |
| 0.50000 | 0.04888 | −0.02775 |
| 0.55000 | 0.04673 | −0.02662 |
| 0.60000 | 0.04393 | −0.02491 |
| 0.65000 | 0.04037 | −0.02268 |
| 0.70000 | 0.03592 | −0.01996 |
| 0.75000 | 0.03052 | −0.01682 |
| 0.80000 | 0.02430 | −0.01337 |
| 0.85000 | 0.01751 | −0.00974 |
| 0.90000 | 0.01046 | −0.00597 |
| 0.95000 | 0.00407 | −0.00236 |
| 1.00000 | 0.00207 | −0.00079 |

Leading edge radius r/C = 0.00844,
Center of circle X/C = 0.00842, Y/C = 0.00064, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

According to the invention, since the leading edge radius and the camber line are optimized in comparison to a conventional symmetric blade having a thickness to chord ratio of 8% (for example, NACA0008), pressure distribution over the upper surface of the aerofoil is flattened and the noise level of the main rotor rotation can be reduced by several dB (decibel) points from that of the conventional blade. Moreover, a maximum lift coefficient Clmax is greatly improved. Also because the drag divergence Mach number Mdd is increased with the aerofoil of the invention, generation of shock waves which cause HSI noise can be suppressed.

The invention also provides a helicopter blade aerofoil having coordinate values with ±3% errors of upper and lower surfaces on the basis of an aerofoil having a thickness to chord ratio of 5% to 11% defined on the basis of the aforementioned reference aerofoil having the thickness to chord ratio of 8% (AK080A).

According to the invention, an aerofoil having a thickness to chord ratio of 5% (AK050A) is obtained by multiplying the values of Yup/C and Ylow/C by ⅝ for all chord lines X/C on the basis of the reference aerofoil having a thickness to chord ratio of 8% (AK080A). An aerofoil having a thickness to chord ratio of 11% (AK110A) is obtained by multiplying the values by ¹¹⁄₈. Therefore, similar effect can be achieved with any aerofoil a having thickness to chord ratio within a range from 5% to 11%, obtained by multiplying a constant factor for the reference aerofoil (AK080A).

Also the invention provides a helicopter blade aerofoil having coordinate values with ±3% errors of upper and lower surfaces on the basis of a reference aerofoil having a thickness to chord ratio of 8% (hereinafter referred to as AK080B), of which upper and lower surfaces are substantially defined by the following coordinates and of which leading edge profile is substantially defined by the following leading edge radius and center of a circle:

| X/C | Yup/C | Ylow/C |
|---|---|---|
| 0.00000 | 0.00000 | 0.00000 |
| 0.00250 | 0.00816 | −0.00489 |
| 0.00500 | 0.01165 | −0.00672 |
| 0.00750 | 0.01468 | −0.00769 |
| 0.01000 | 0.01723 | −0.00853 |
| 0.01750 | 0.02335 | −0.01034 |
| 0.02500 | 0.02804 | −0.01154 |
| 0.05000 | 0.03838 | −0.01463 |
| 0.07500 | 0.04428 | −0.01677 |
| 0.10000 | 0.04776 | −0.01843 |
| 0.15000 | 0.05089 | −0.02087 |
| 0.20000 | 0.05176 | −0.02297 |
| 0.25000 | 0.05197 | −0.02489 |
| 0.30000 | 0.05198 | −0.02647 |
| 0.35000 | 0.05170 | −0.02760 |
| 0.40000 | 0.05111 | −0.02821 |
| 0.45000 | 0.05008 | −0.02827 |
| 0.50000 | 0.04845 | −0.02775 |
| 0.55000 | 0.04620 | −0.02662 |
| 0.60000 | 0.04331 | −0.02491 |
| 0.65000 | 0.03967 | −0.02268 |
| 0.70000 | 0.03516 | −0.01996 |
| 0.75000 | 0.02976 | −0.01682 |
| 0.80000 | 0.02361 | −0.01337 |
| 0.85000 | 0.01695 | −0.00974 |
| 0.90000 | 0.01007 | −0.00597 |
| 0.95000 | 0.00393 | −0.00236 |
| 1.00000 | 0.00207 | −0.00079 |

Leading edge radius r/C = 0.00780,
Center of circle X/C = 0.00772, Y/C = 0.00110, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

According to the invention, similarly to the aforementioned case, because the leading edge radius and the camber line are optimized in comparison to the conventional symmetric blade (for example, NACA0008), pressure distribution over the upper surface of the aerofoil is flattened and the noise level of the main rotor rotation can be reduced by several dB points from that of the conventional blade. Moreover, maximum lift coefficient Clmax is greatly improved. Further, in the aerofoil of the invention, since the drag divergence Mach number Mdd is increased, generation of shock waves which cause HSI noise can be suppressed.

The invention also provides a A helicopter blade aerofoil having coordinate values with ±3% errors of upper and lower surfaces on the basis of an aerofoil having a thickness to chord ratio of 5% to 11% defined on the basis of the aforementioned reference aerofoil having the thickness to chord ratio of 8% (AK080B).

According to the invention, an aerofoil having a thickness to chord ratio of 5% (AK050B) is obtained by multiplying the values of Yup/C and Ylow/C by ⅝ for all chord lines X/C on the basis of the reference aerofoil having a thickness to chord ratio of 8% (AK080B). An aerofoil section having a thickness to chord ratio of 11% (AK110B) is obtained by multiplying the values by ¹¹⁄₈. Therefore, a similar effect can be achieved with any aerofoil having a thickness to chord ratio within a range from 5% to 11%, by multiplying a constant factor for the reference aerofoil (AK080B).

BRIEF DESCRIPTION OF DRAWINGS

FIG. 4A and FIG. 4B show aerodynamic characteristics of a rotor of a helicopter in forward flight.

BEST MODE FOR CARRYING OUT THE INVENTION

Figure 1:
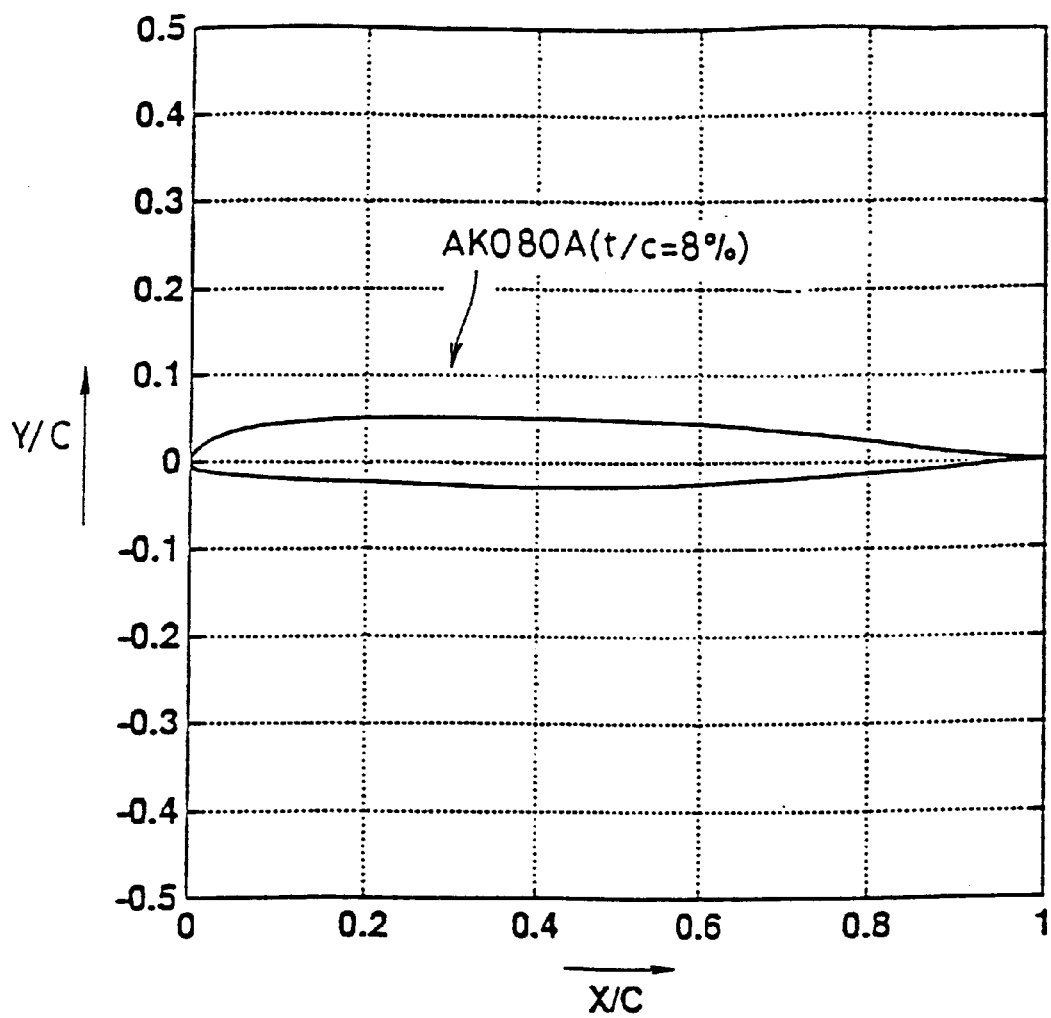
FIG. 1 is a graph showing an aerofoil configuration of AK080A of a first embodiment of the invention.
Figure 2:
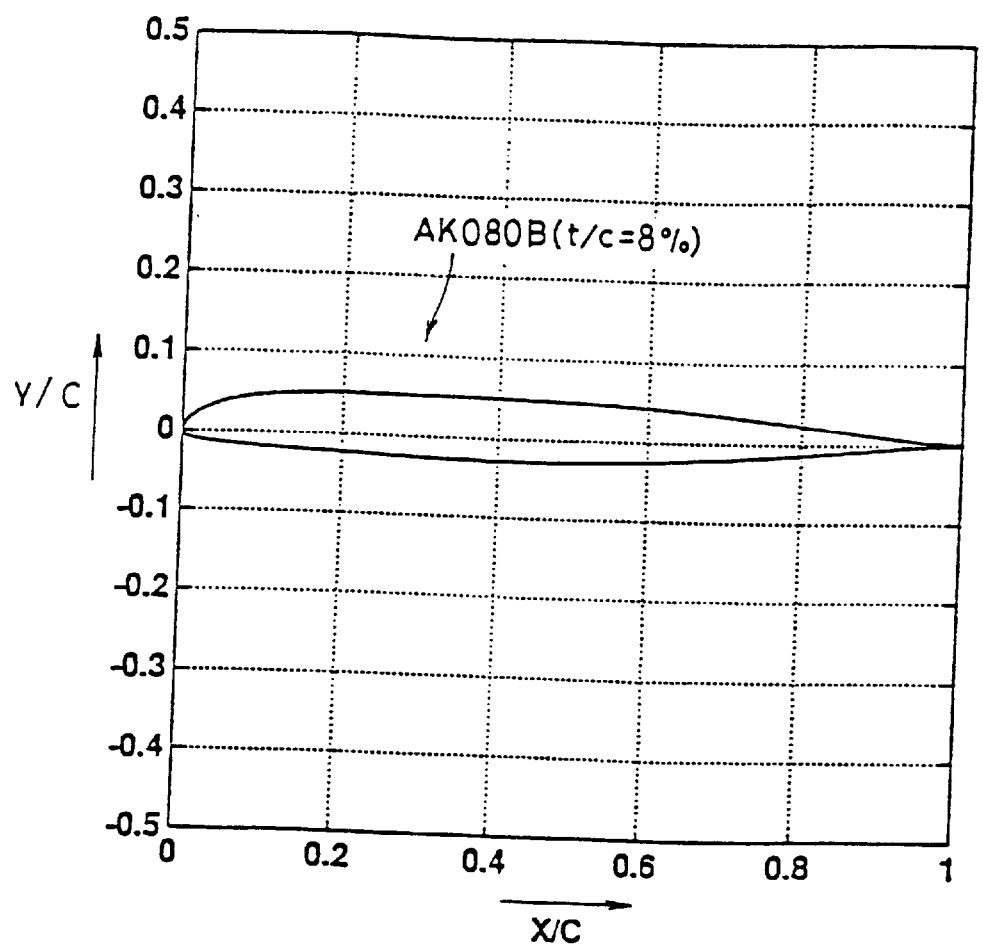
FIG. 2 is a graph showing an aerofoil configuration of AK080B of a second embodiment of the invention.

FIG. 1 is a graph showing the aerofoil configuration of AK080A of a first embodiment of the invention, having a thickness to chord ratio of t/c=8%. FIG. 2 is a graph showing an aerofoil configuration of AK080B of a second embodiment of the invention, having a thickness to chord ratio of t/c=8%.

In the aerofoils AK080A and AK080B of the invention, the leading edge radius and camber line are optimized so that pressure distribution over the upper surface of the aerofoil is flattened with the peak pressure around the leading edge, in particular, being suppressed so that the entire pressure distribution is flattened, compared to the conventional symmetric aerofoil (NACA0008). Therefore the noise level of the main rotor rotation can be reduced by several dB points over the prior art.

Moreover, since the aerofoils of the invention have the profile characteristics described previously (the leading edge radius and camber line are optimized), lift is increased, resulting in a great improvement in the maximum lift coefficient Clmax.

Further in each aerofoil of the invention, since drag divergence Mach number Mdd becomes greater, shock waves which cause HSI noise can be reduced in intensity.

Figure 3:
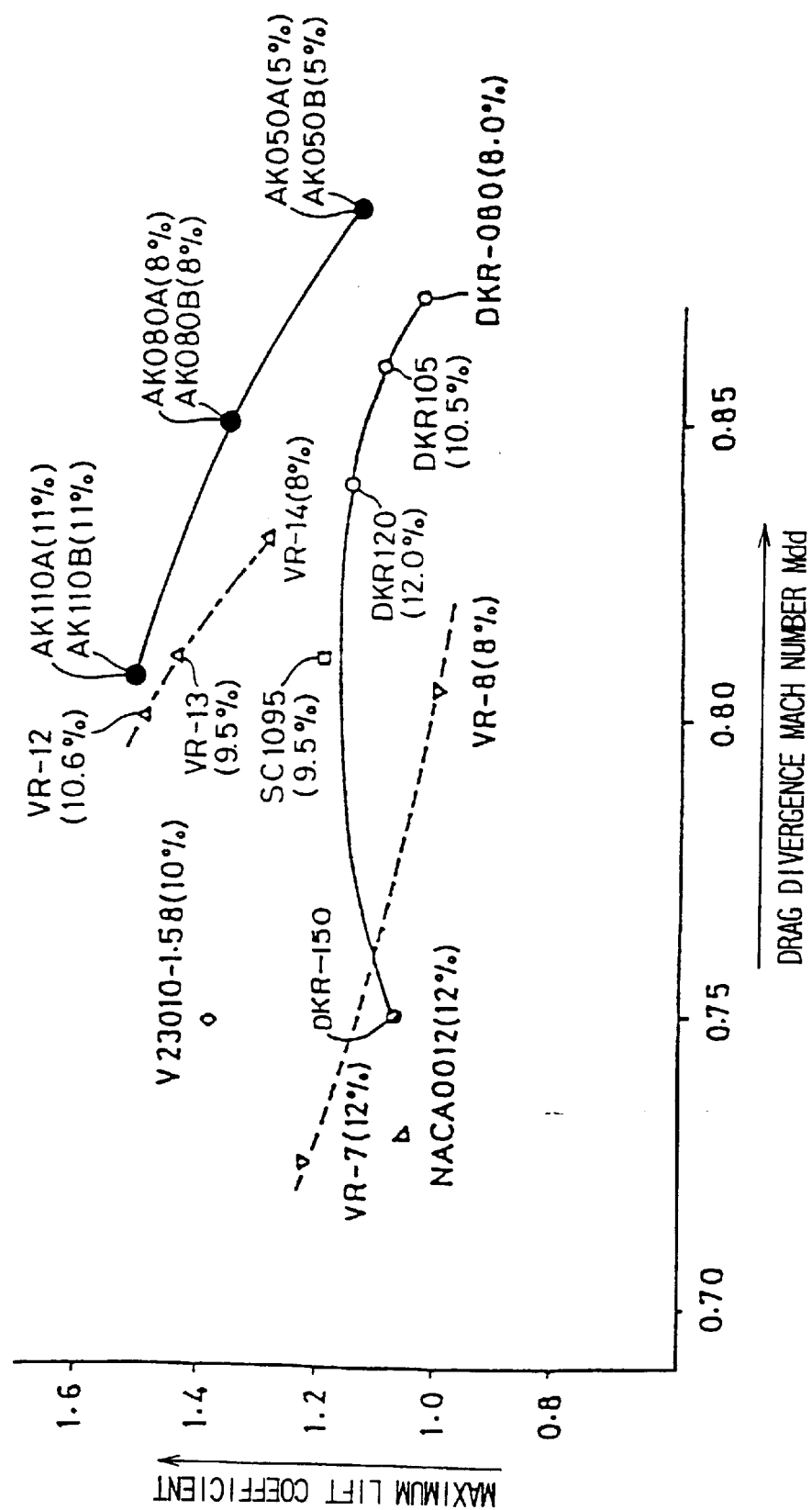
FIG. 3 is a graph showing results of comparing aerofoils of the invention and the prior art.
Figure 5:
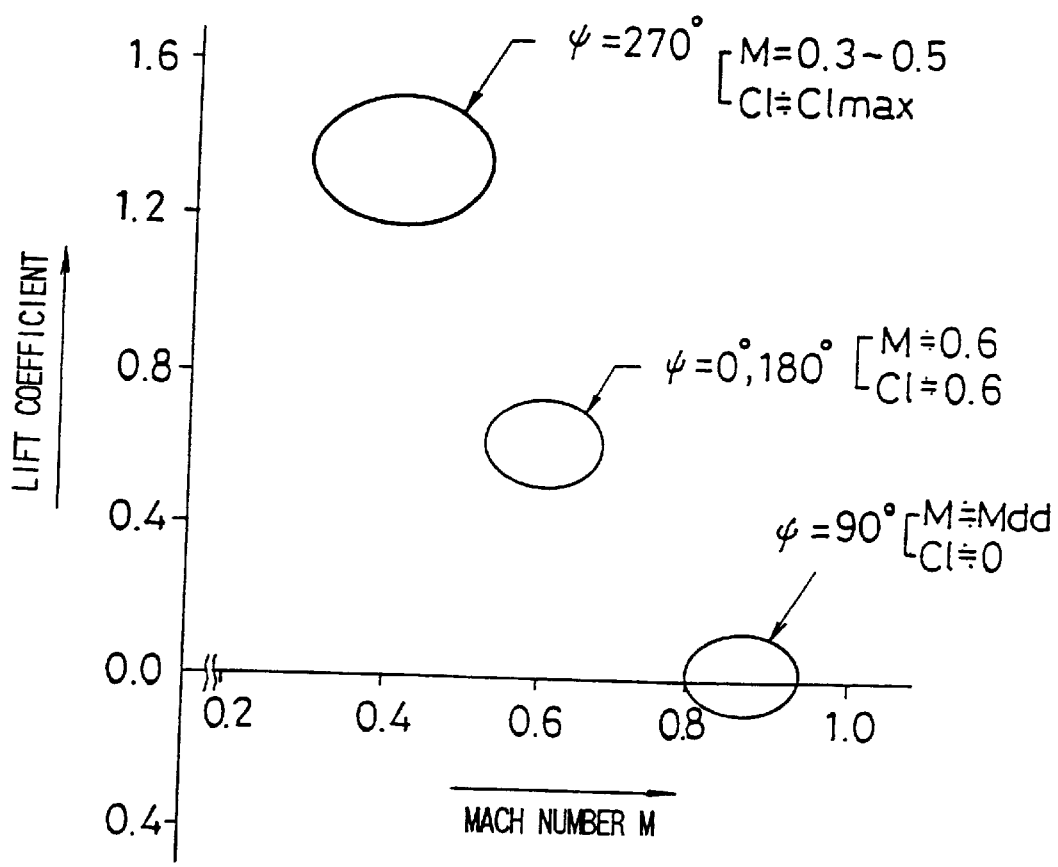
FIG. 5 is a graph showing an operating environment of a helicopter rotor blade.
Figure 6:
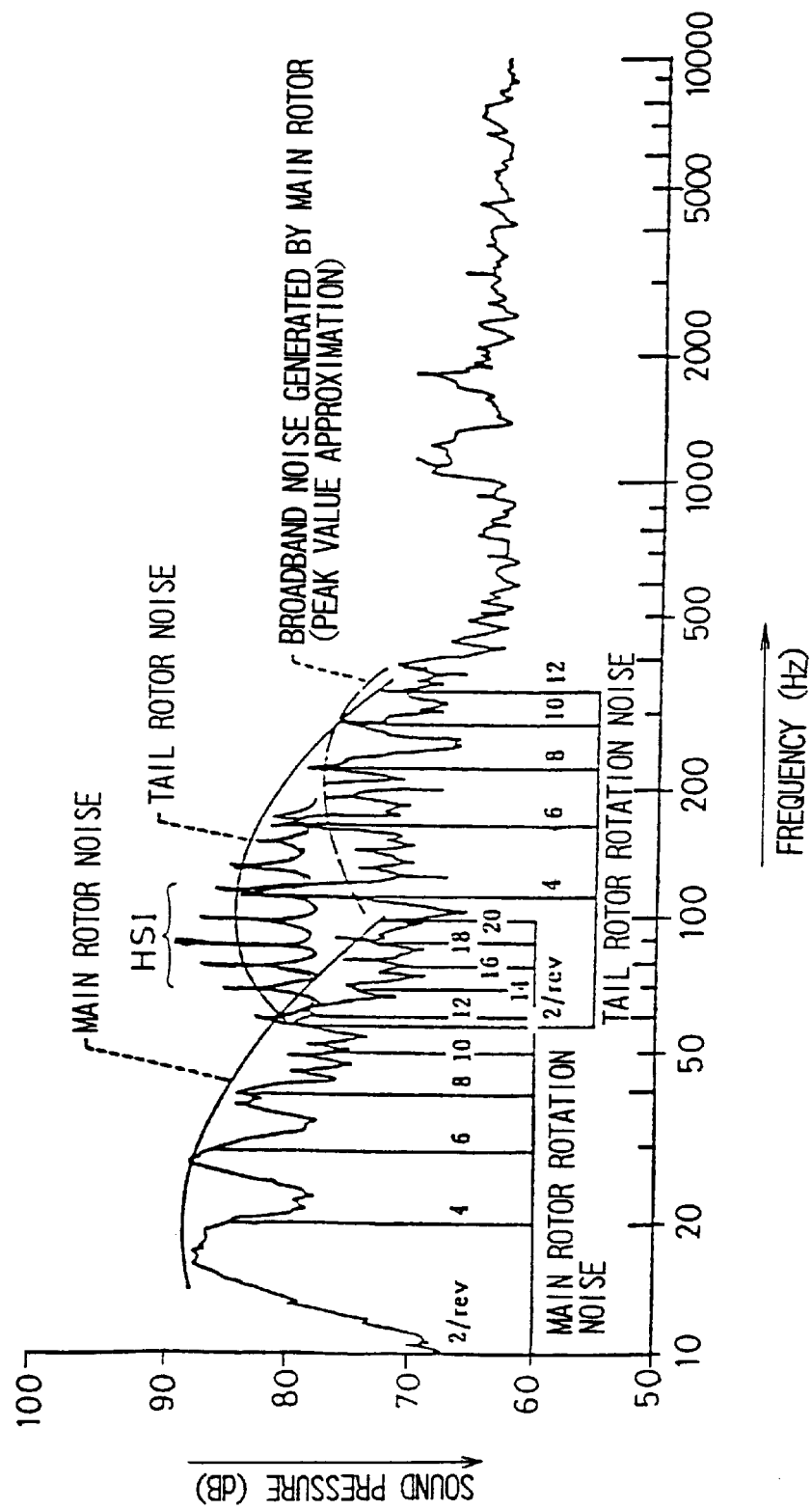
FIG. 6 is a graph showing frequency spectrums of noise generated by a helicopter.

FIG. 3 is a graph showing results of comparing aerofoils of the invention and the prior art. This graph is drawn by using FIG. 3 of Japanese Unexamined Patent Publication JP-A 59-134096 (1984). Reference characters identifying different points in the graph are abbreviations of the names of the aerofoils, with numbers in parentheses showing the thickness to chord ratios (t/c). The aerofoils AK080A and AK080B of the invention having a thickness to chord ratio of 8% give a drag divergence Mach number Mdd of approximately 0.85 and a maximum lift coefficient Clmax of approximately 1.37, both being significantly improved as compared to those of the conventional aerofoil. Consequently, it is made possible to shift the loci of coordinates of Mach number and lift coefficient in a direction toward right upward as a whole, while the rotor makes one revolution, indicating a superior performance of the aerofoils of the invention as a helicopter blade aerofoil.

In the aerofoil AK050A and AK050B, which are obtained by changing the thickness to chord ratio to 5% on the basis of the aerofoils AK080A and AK080B, on the other hand, drag divergence Mach number Mdd is greatly improved, while the aerofoils AK110A and AK110B of which thickness to chord ratios are changed to 11% have a greatly improved maximum lift coefficient Clmax, indicating that the aerofoils having a thickness to chord ratio within a range from 5% to 11% have far better performance than the prior arts.

EFFECT OF THE INVENTION

According to the invention, as described above in detail, since the leading edge radiuses and camber lines of the aerofoils are optimized in comparison to those of the conventional symmetric aerofoils (NACA0008, for example), pressure distribution over the upper surface of the aerofoil is flattened, the noise level of the main rotor rotation can be reduced by several dB points from that of the prior art, and maximum lift coefficient Clmax is greatly improved. Further in the aerofoils of the invention, since drag divergence Mach number Mdd also increases, shock waves which cause HSI noise can be reduced in intensity.

Thus such helicopter blade aerofoils can be obtained that have higher drag divergence Mach number Mdd and higher maximum lift coefficient Clmax, and are capable of reducing the noise level.

We claim:

1. A helicopter blade aerofoil having coordinate values with ±3% errors of upper and lower surfaces on the basis of a reference aerofoil having a thickness to chord ratio of 8%, of which upper and lower surfaces are substantially defined by the following coordinates and of which leading edge profile is substantially defined by the following leading edge radius and center of a circle:

| X/C | Yup/C | Ylow/C |
| --- | --- | --- |
| 0.00000 | 0.00000 | 0.00000 |
| 0.00250 | 0.00781 | −0.00558 |
| 0.00500 | 0.01131 | −0.00765 |
| 0.00750 | 0.01423 | −0.00874 |
| 0.01000 | 0.01660 | −0.00964 |
| 0.01750 | 0.02224 | −0.01156 |
| 0.02500 | 0.02658 | −0.01276 |
| 0.50000 | 0.03585 | −0.01568 |
| 0.07500 | 0.04128 | −0.01758 |
| 0.10000 | 0.04480 | −0.01901 |
| 0.15000 | 0.04893 | −0.02113 |
| 0.20000 | 0.05095 | −0.02306 |
| 0.25000 | 0.05181 | −0.02492 |
| 0.30000 | 0.05200 | −0.02647 |
| 0.35000 | 0.05179 | −0.02760 |
| 0.40000 | 0.05129 | −0.02821 |
| 0.45000 | 0.05038 | −0.02827 |
| 0.50000 | 0.04888 | −0.02775 |
| 0.55000 | 0.04673 | −0.02662 |
| 0.60000 | 0.04393 | −0.02491 |
| 0.65000 | 0.04037 | −0.02268 |
| 0.70000 | 0.03592 | −0.01996 |
| 0.75000 | 0.03052 | −0.01682 |
| 0.80000 | 0.02430 | −0.01337 |
| 0.85000 | 0.01751 | −0.00974 |
| 0.90000 | 0.01046 | −0.00597 |
| 0.95000 | 0.00407 | −0.00236 |
| 1.00000 | 0.00207 | −0.00079 |

Leading edge radius r/C = 0.00844,
Center of circle X/C = 0.00842, Y/C = 0.00064, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

2. A helicopter blade aerofoil having coordinate values with ±3% errors of upper and lower surfaces on the basis of an aerofoil having a thickness to chord ratio of 8% defined on the basis of the reference aerofoil of claim 1 having the thickness to chord ratio of 5% to 11%.

3. A helicopter blade aerofoil having coordinate values with ±3% errors of upper and lower surfaces on the basis of a reference aerofoil having a thickness to chord ratio of 5% to 11%, of which upper and lower surfaces are substantially defined by the following coordinates and of which a leading edge profile is substantially defined by the following leading edge radius and center of a circle:

| X/C | Yup/C | Ylow/C |
|---|---|---|
| 0.00000 | 0.00000 | 0.00000 |
| 0.00250 | 0.00816 | −0.00489 |
| 0.00500 | 0.01165 | −0.00672 |
| 0.00750 | 0.01468 | −0.00769 |
| 0.01000 | 0.01723 | −0.00853 |
| 0.01750 | 0.02335 | −0.01034 |
| 0.02500 | 0.02804 | −0.01154 |
| 0.05000 | 0.03838 | −0.01463 |
| 0.07500 | 0.04428 | −0.01677 |
| 0.10000 | 0.04776 | −0.01843 |
| 0.15000 | 0.05089 | −0.02087 |
| 0.20000 | 0.05176 | −0.02297 |
| 0.25000 | 0.05197 | −0.02489 |
| 0.30000 | 0.05198 | −0.02647 |
| 0.35000 | 0.05170 | −0.02760 |
| 0.40000 | 0.05111 | −0.02821 |
| 0.45000 | 0.05008 | −0.02827 |
| 0.50000 | 0.04845 | −0.02775 |
| 0.55000 | 0.04620 | −0.02662 |
| 0.60000 | 0.04331 | −0.02491 |
| 0.65000 | 0.03967 | −0.02268 |
| 0.70000 | 0.03516 | −0.01996 |
| 0.75000 | 0.02976 | −0.01682 |
| 0.80000 | 0.02361 | −0.01337 |
| 0.85000 | 0.01695 | −0.00974 |
| 0.90000 | 0.01007 | −0.00597 |
| 0.95000 | 0.00393 | −0.00236 |
| 1.00000 | 0.00207 | −0.00079 |

Leading edge radius r/C = 0.00780,
Center of circle X/C = 0.00772, Y/C = 0.00110, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

4. A helicopter blade aerofoil having coordinate values with ±3% errors of upper and lower surfaces on the basis of an aerofoil having a thickness to chord ratio of 5% to 11% defined on the basis of the reference aerofoil of claim 3 having the thickness to chord ratio of 8%.

* * * * *

UNITED STATES PATENT AND TRADEMARK OFFICE
CERTIFICATE OF CORRECTION

PATENT NO.   : 5,957,662
DATED        : September 28, 1999
INVENTOR(S)  : Aoki et al.

It is certified that error appears in the above-identified patent and that said Letters Patent is hereby corrected as shown below:

Title Page,
Item [73], Assignee: "Gifu," should read -- Kakamigahara, --;

Column 6,
Line 17: "8%," should read -- 5% to 11%, --;
Line 19: "which leading" should read -- which a leading --;

Column 8,
Line 19: "5% to 11% should read -- 8% --.

Signed and Sealed this

Seventh Day of August, 2001

Attest:

NICHOLAS P. GODICI
Attesting Officer   Acting Director of the United States Patent and Trademark Office